Patented May 31, 1938

2,118,985

UNITED STATES PATENT OFFICE 2,118,985

MANUFACTURE OF WATER-SOLUBLE ALKALINE-EARTH METAL SALTS AND PRODUCTS OBTAINED THEREBY

Hans Schmidt, Wuppertal-Vohwinkel, and Heinrich Jung, Wuppertal-Hammerstein, Germany, assignors to Winthrop Chemical Company Inc., New York, N. Y., a corporation of New York No Drawing. Application December 21, 1934, Serial No. 758,702. In Germany December 23, 1933

15 Claims. (Cl. 260—106)

This invention relates to the manufacture of water-soluble alkaline-earth metal salts of water-soluble condensation products of citric and tartaric acid with polyhydric alcohols and to products obtainable by the said process.

In accordance with the present invention therapeutically useful preparations of the alkaline-earth metals are obtainable by the manufacture of the alkaline-earth metal salts of water-soluble condensation products of citric and tartaric acid with a polyhydric alcohol, particularly with a polyhydric alcohol containing from 3 to 6 carbon atoms and at least 3 hydroxyl groups. The said condensation products are of the type of acid esters of the said acids.

The condensation of the citric and tartaric acid with the alcohols of from 3 to 6 carbon atoms containing at least 3 hydroxyl groups must be carried out with care. When performing the condensation by heating the components at higher temperatures during several hours, by-reactions take place, for instance, carbon dioxide splits off and products are obtained which are wholly or partially insoluble in water and therefore are not suitable for the purpose of the present invention.

In accordance with the present invention the condensation of citric and tartaric acid with the polyhydric alcohols specified, for instance, with glycerol, erythritol, mannitol and sorbitol is considerably facilitated and accelerated while practically avoiding the formation of by-products when heating the components under reduced pressure, say at about from 10 to 60 mms. while simultaneously removing the water which splits off. At a temperature of about 110° to 130° C. the condensation begins, the water splitting off normally is removed by the evacuation current. When working in this manner the continuously escaping bubbles of steam effect a good mixing of the reaction mixture so that in general a particular stirring of the reaction mixture is not required. The height of pressure employed depends in general on the appliances available; best working is effected at a pressure as low as possible, for instance, at about 10 to about 60 mms. in order to attain that the water is removed as quickly as possible. It is not necessary to use definite molecular quantities of the reacting components for the condensation; but it is essential that the splitting off of water is effected in such a manner that acid condensation products which are capable of forming salts with the alkaline-earth metal bases are obtained. Advantageously molecular quantities of the reacting components are used and the condensation is so effected that products are obtained in which practically one carboxyl group of the acid used is esterified, so that in the case of the tartaric acid about 1 free carboxylic acid group, and in the case of the citric acid about two free carboxylic acid groups are still present. In order to effect the condensation in this manner the heating of the reaction mixture is continued until calculated upon the water-free components only 1 mol. of water is split off upon 1 mol. of the acid. On neutralizing the ester acids thus obtainable by means of an alkaline-earth metal oxide, hydroxide or carbonate, salts are obtained which have approximately the composition of the salts of the monoester-acids. Acid condensation products capable of forming salts are also obtainable when more than 1 mol. of the acid upon 1 mol. of the polyhydric alcohol is used, and when more water is split off in the condensation process, but at least 1 free carboxylic acid group should be present in the reaction product.

Thus condensation products are obtainable which completely dissolve in water and form with alkaline-earth metal oxides, hydroxides or carbonates, that is with the corresponding calcium, strontium, barium and magnesium compounds on neutralization water-soluble salts which may be separated from the reaction mixture by precipitation with a water-soluble alcohol, such as methyl and ethyl alcohol.

It may be mentioned that the working under reduced pressure is not absolutely necessary when using citric acid. Water-soluble alkaline-earth metal salts are also obtainable from condensation products of the citric acid which are prepared by stirring the heated condensation mixture or by passing through a current of an indifferent gas, for instance, air, so that the removal of the water which has split off is facilitated. However, it is difficult to avoid by-reactions under such conditions and the reaction products do not display the favorable properties of the products referred to above.

The calcium and magnesium salts obtained in the above described manner, particularly those of the citric acid condensation products are especially suitable for peroral calcium and magnesium medication. They may contain a small content of the non-neutralized condensation product.

The invention is further illustrated by the following examples without being being restricted thereto:—

*Example 1.*—A pulverized mixture of 92 grams of mannitol and 105 grams of crystallized citric acid is melted in a vessel capable of being evacuated, the vessel is then connected with a water-jet vacuum pump and the melt kept for about one hour at an inside temperature of about 120° C. at about 18 mm. pressure. A sirupy melt is thus obtained which solidifies on cooling and is readily soluble in water.

In order to transform the melt into the calcium salt it is dissolved in a small quantity of water, saturated while stirring with calcium carbonate and filtered. The mannitol-citric acid calcium formed is precipitated by pouring the filtrate into excess alcohol. After separating and drying the precipitate, a powder which is readily soluble in water, almost tasteless and colorless, and containing 8.5% of calcium is obtained in a yield of more than 200 grams. For the formation of the salt likewise calcium hydroxide may be used.

Corresponding results are obtained when taking instead of mannitol, for instance, dulcitol or erythritol for the condensation.

Example 2.—A pulverized mixture of 380 grams of sorbitol and 420 grams of crystallized citric acid is melted in a vessel capable of being evacuated. The vessel is connected with a vacuum pump and the mixture is heated at an outside temperature of 120° C. at about 15 mms. pressure for about 2 hours. The decrease in weight during that time amounts to about 90-95 grams. A sirupy mass is obtained which solidifies on cooling.

For transforming the acid reaction product into the calcium salt the melt is dissolved in water which is filled up to 2 liters. The titration with a solution of normal caustic soda shows that practically two carboxyl groups are still free. The solution is saturated while stirring with calcium carbonate. The solution is filtered and the calcium salt formed is precipitated by pouring the solution into about 4 liters of methyl alcohol while stirring. After separating and drying the precipitate a white, readily water-soluble, almost tasteless powder is obtained in a yield of about 840-880 grams, containing about 8.5% of calcium. The product approximately corresponds to the formula:

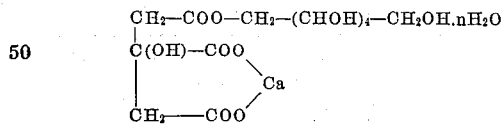

in which $n$ stands for a whole number of molecules of crystal water contained in the final product.

In a similar manner the melt can be neutralized with barium carbonate and magnesium oxide. Thus the corresponding salts are obtainable.

Example 3.—A melt produced in accordance with the directions given in Example 2 is taken up in water and neutralized by adding magnesium carbonate while stirring. The mixture is filtered and precipitated by pouring in methyl alcohol while stirring. After separating and drying the precipitate a white, readily water-soluble, almost tasteless powder is obtained containing about 5.5% of magnesium.

Instead of magnesium carbonate also magnesium oxide may be employed for the formation of the salt.

Melting can also be effected at 100 mms. pressure, but this process takes more than 2 hours. Likewise when lowering the temperature to about 110° C., prolonged heating is required, whereas an elevation of the temperature to 130° C. requires shorter heating.

Example 4.—The process is effected in accordance with the directions given in Example 3, except that the aqueous solution of the melt is neutralized with barium carbonate. A powder containing about 22% of barium and which is readily soluble in water is thus obtained in a good yield.

In an analogous manner, for instance, a strontium salt may be produced.

Example 5.—A pulverized mixture of 95 grams of sorbitol and 75 grams of tartaric acid is melted, then heated at an outside temperature of 120° C. at about 15 mms. pressure until the decrease in weight amounts to about 10-12 grams, occurring in about one hour. The cooled melt is taken up in water. Titration with a solution of normal caustic soda shows that one carboxyl group is still free. The solution is saturated with calcium carbonate, filtered and precipitated by pouring into alcohol while stirring. After separating and drying the precipitate a white, readily water-soluble powder containing about 5% of calcium is obtained.

In an analogous manner for instance the same quantity of sorbitol can be condensed with 150 grams of tartaric acid. On a correspondingly higher loss of water a product is obtained which after transformation into the calcium salt shows a higher calcium content.

Example 6.—A mixture of 48 grams of glycerol and 105 grams of crystallized citric acid is kept at an outside temperature of 120° C. and at a pressure of about 15 mms. After about one hour and a half a decrease in weight of 18-20 grams is observed. The cooled melt is then taken up in water and the solution obtained neutralized with calcium carbonate. After filtering the mixture is precipitated by pouring into methyl alcohol while stirring. After separating, a white, readily water-soluble powder containing about 11-11.5% of calcium is obtained in a yield amounting to more than 140 grams.

In an analogous manner, for instance, 48 grams of glycerol with 210 grams of crystallized citric acid may be condensed. After a decrease in weight of about 37 grams of water a product is obtained which after transformation into the calcium salt yields a product of a higher calcium content.

Example 7.—A pulverized mixture of 947 grams of sorbitol and 960 grams of water-free citric acid is melted and heated at an outside temperature of 120° C. at about 15 mms. pressure. The melt may be thoroughly stirred by means of a stirring apparatus but generally the steam bubbles continually rising because of the under-pressure provide for a sufficient mixing of the melt. After about one hour and a half the decrease amounts to about 132 grams. The process is interrupted and the mixture is treated as indicated in Example 2. Thus 2100 grams of a colorless product of the same properties as indicated in Example 2 are obtained.

By uncomplete neutralization with calcium carbonate a weakly acid, water-soluble calcium salt is obtained.

Example 8.—75 grams of pulverized tartaric acid are melted with the addition of 48 grams of glycerol. The melt is kept at an outside temperature of 120° C. and at a pressure of 50 to 60 mms. mercury. After about half an hour the decrease in weight amounts to about 9 grams. The process is interrupted, the melt is dissolved in water, the solution treated with calcium carbonate, filtered and the calcium salt formed precipitated by pouring into methyl or ethyl alcohol while stirring. After separating and drying the precipitate, a colorless, readily water-soluble powder containing about 7% of calcium is obtained.

*Example 9.*—A pulverized mixture of 95 grams of sorbitol (about ½ mol.) and 210 grams of crystallized citric acid (1 mol.) is melted and kept at about 15 mms. pressure at an outside temperature of 120° C., the water which splits off being continuously sucked off. After about 1¾ hours a decrease in weight of about 41 grams is attained. The melt is dissolved in water. From the three carboxyl groups, according to titration, two still are free. The melt is dissolved in water to about 800 ccs., the solution saturated with calcium carbonate, filtered and the filtrate is precipitated by pouring into methyl alcohol while stirring. After separating and drying the precipitate in the air, about 350 grams of a colorless, readily water-soluble product containing about 11.5% of calcium are obtained.

Likewise, for instance, 95 grams of sorbitol may be condensed with 157 grams of crystallized citric acid. At a decrease of about 33 grams of water a product is obtained which after the transformation into the calcium salt has a lower calcium content. It corresponds to a mixture of the mono- and diester acid salt.

*Example 10.*—A pulverized mixture of 92 grams of mannitol and 105 grams of citric acid is heated in an open vessel to 130° C. (outside temperature) while stirring. After about 3 hours the decrease in weight amounts to about 20 grams. The cooled melt is dissolved in water, the solution is filled up to 500 ccs., neutralized with calcium carbonate, filtered after some standing and the calcium salt formed is precipitated by pouring into methyl alcohol while stirring. After separating and drying the precipitate in the air, a powder which is readily soluble in water and contains about 7.5% of calcium is obtained.

*Example 11.*—A pulverized mixture of 95 grams of sorbitol and 105 grams of citric acid is heated in an open vessel to 120° C. (outside temperature) while stirring. After 5 hours—the decrease in weight amounts to about 21-22 grams—the melt is cooled, dissolved in water, the solution filled up to one liter, neutralized with calcium carbonate, filtered after some standing and precipitated by pouring into methyl alcohol while stirring. After separating and drying the precipitate about 190 grams of a white substance containing about 7.4% of calcium and being readily soluble in water is obtained.

When precipitating the calcium salt in concentrated solution about 200 grams of a weakly yellowish product containing about 6.5-7% of calcium are obtained.

Instead of the calcium salt also the barium, strontium and magnesium salt may be employed.

*Example 12.*—105 grams of crystallized citric acid and 48 grams of glycerol are heated in a closed vessel to 130° C. (outside temperature) while stirring. When the decrease in weight amounts to about 19 to 20 grams, the process is interrupted and the cooled melt is treated as indicated in Example 10. About 140 grams of a colorless powder containing about 10% of calcium are obtained.

*Example 13.*—A pulverized mixture of 95 grams of sorbitol and 96 grams of water-free citric acid is heated in an open vessel to 130° C. (outside temperature) while stirring. After about 3½ hours the decrease in weight amounts to about 13 grams. The cooled melt is dissolved in water, and treated as indicated in Example 10 to obtain the calcium salt. A product containing about 7% of calcium is thus obtained.

When not completely saturating the melt with calcium carbonate also a weakly acid, water-soluble calcium salt can be obtained.

*Example 14.*—A melt produced in accordance with the directions given in Example 11 is taken up in water, filtered and neutralized by the addition of magnesium carbonate or magnesium oxide while stirring. The solution is filtered and the filtrate is precipitated by pouring into methyl alcohol while stirring. After separating and drying the precipitate a white, readily water-soluble product containing about 4% of magnesium is obtained.

*Example 15.*—A pulverized mixture of 95 grams of sorbitol and 157 grams of crystallized citric acid is heated in a closed vessel to 130° C. (outside temperature) while stirring and passing through air and kept at this temperature for about 2½ to 3 hours until a decrease in weight of about 33 grams is observed. The cooled melt is dissolved in water, the solution saturated with calcium carbonate, filtered and the calcium salt formed is precipitated by pouring into methyl alcohol while stirring. After separating and drying the precipitate a product containing about 8.5 to 9% of calcium which is readily soluble in water is obtained.

In the appended claims the term "alkaline-earth metal" is intended to include calcium, strontium, barium as well as magnesium.

We claim:—

1. The process which comprises heating a mixture of a polybasic aliphatic carboxylic acid selected from the group consisting of tartaric and citric acid with an at least trihydric alcohol of from 3 to 6 carbon atoms under reduced pressure and removing from the mixture the water which splits off, the heating is continued until, calculated on the water-free components, at least one carboxylic acid group per one mol. of the acid employed is still present in the free state, and then adding to the aqueous solution of the reaction mixture an alkaline earth metal compound selected from the group consisting of oxides, hydroxides and carbonates until the reaction mixture is about neutral.

2. The process which comprises heating a mixture of a polybasic aliphatic carboxylic acid selected from the group consisting of tartaric and citric acid with an at least trihydric alcohol of from 3 to 6 carbon atoms under reduced pressure and removing from the mixture the water which splits off, the heating is continued until, calculated on the water-free components, at least one carboxylic acid group per one mol. of the acid employed is still present in the free state, and then adding to the aqueous solution of the reaction mixture calcium carbonate until the reaction mixture is about neutral.

3. The process which comprises heating a mixture of citric acid and a polyhydric alcohol of the formula $C_6H_{14}O_6$, and removing from the mixture the water which splits off, the heating is continued until, calculated on the water-free components, at least one carboxylic acid group per one mol. of the acid employed is still present in the free state, and then adding to the aqueous solution of the reaction mixture an alkaline earth metal compound selected from the group consisting of oxides, hydroxides and carbonates until the reaction mixture is about neutral.

4. The process which comprises heating a mixture of citric acid and a polyhydric alcohol of the formula $C_6H_{14}O_6$, and removing from the mixture the water which splits off, the heating is continued until, calculated on the water-free components, at least one carboxylic acid group per one mol. of the acid employed is still present in the free state, and then adding to the aqueous solution of the reaction mixture calcium carbonate until the reaction mixture is about neutral.

5. The process which comprises heating a mixture of citric acid and a hexahydric alcohol of the formula $C_6H_{14}O_6$ under reduced pressure at a temperature of about 110° to 130° C., and removing the water which splits off, the heating is continued until, calculated on the water-free components, at least one carboxylic acid group per one mol. of the acid employed is still present in the free state, and then adding to the aqueous solution of the reaction mixture calcium carbonate until the reaction mixture is about neutral.

6. The process which comprises heating a mixture of about 1 mol. of citric acid with about 1 mol. of sorbitol under reduced pressure at a temperature of about 110° to 130° C., and removing the water which splits off, the heating is continued until, calculated on the water-free components, at least one carboxylic acid group per one mol. of the acid employed is still present in the free state, and then adding to the aqueous solution of the reaction mixture calcium carbonate until the reaction mixture is about neutral.

7. The alkaline-earth metal salts of water-soluble acid condensation products of citric acid with an at least trihydric alcohol of from 3 to 6 carbon atoms, which salts are soluble in water.

8. The alkaline-earth metal salts of water-soluble acid condensation products of citric acid with a hexahydric alcohol of the formula $C_6H_{14}O_6$, which salts are soluble in water.

9. The calcium salts of water-soluble acid condensation products of citric acid with an at least trihydric alcohol of from 3 to 6 carbon atoms, which salts are soluble in water.

10. The calcium salts of water-soluble acid condensation products of citric acid with a hexahydric alcohol of the formula $C_6H_{14}O_6$, which salts are soluble in water.

11. The calcium salts of a dibasic monoester of citric acid with a hexahydric alcohol of the formula $C_6H_{14}O_6$, which salts are soluble in water.

12. The calcium salt of the dibasic monoester of citric acid with sorbitol, which salt is soluble in water.

13. The process of claim 1 wherein the alkaline-earth metal is calcium.

14. The process which comprises heating a mixture of citric acid and polyhydric alcohol of the formula $C_6H_{14}O_6$, and removing from the mixture the water which splits off, continuing the heating until, calculated on the water free components, at least one carboxylic acid group per one mol. of the acid employed is still present in the free state, and then adding to the aqueous solution of the reaction mixture an alkaline-earth metal compound selected from the group consisting of oxides, hydroxides and carbonates until the reaction mixture is about neutral.

15. The process of claim 14, wherein the alkaline-earth metal is calcium.

HANS SCHMIDT.
HEINRICH JUNG.